(12) United States Patent
Janson

(10) Patent No.: US 9,546,720 B2
(45) Date of Patent: Jan. 17, 2017

(54) TORQUE SPLIT CONTINUALLY VARIABLE TRANSMISSION

(71) Applicant: FORD GLOBAL TECHNOLOGIES, LLC, Dearborn, MI (US)

(72) Inventor: David A. Janson, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 457 days.

(21) Appl. No.: 13/864,544

(22) Filed: Apr. 17, 2013

(65) Prior Publication Data

US 2014/0315676 A1    Oct. 23, 2014

(51) Int. Cl.
*F16H 37/02* (2006.01)
*F16H 61/66* (2006.01)

(52) U.S. Cl.
CPC ....... *F16H 37/022* (2013.01); *F16H 2037/023* (2013.01); *F16H 2061/6601* (2013.01)

(58) Field of Classification Search
CPC .............. F16H 37/022; F16H 2037/026; F16H 2037/023; F16H 2061/6601; Y10T 477/328
See application file for complete search history.

(56) References Cited

U.S. PATENT DOCUMENTS

| | | | | |
|---|---|---|---|---|
| 5,803,859 A | * | 9/1998 | Haka | F16H 37/022 475/210 |
| 5,833,571 A | * | 11/1998 | Tsukamoto | F16H 37/0846 475/211 |
| 6,036,616 A | * | 3/2000 | McCarrick | F16H 37/022 475/206 |
| 6,152,848 A | | 11/2000 | Williams et al. | |

FOREIGN PATENT DOCUMENTS

| | | | | |
|---|---|---|---|---|
| CN | 102442209 A | | 5/2012 | |
| DE | 102007009631 A1 | * | 10/2006 | ............ B60K 6/543 |
| JP | 2011112226 A | | 6/2011 | |
| WO | WO2004008001 A1 | | 1/2004 | |

* cited by examiner

*Primary Examiner* — Robert Hodge
*Assistant Examiner* — Ryan Dodd
(74) *Attorney, Agent, or Firm* — James Dottavio; MacMillan, Sobanski & Todd, LLC

(57) ABSTRACT

A transmission includes a first drive secured to an input, producing a fixed drive ratio; a second drive secured to an input, producing a variable drive ratio; a planetary gearset including a member connected to the second drive, and a second member; a brake releasably holding the second member rotatably fixed; a first clutch releasably connecting the first member and an output; and a second clutch releasably connecting the second member and the first drive.

16 Claims, 1 Drawing Sheet

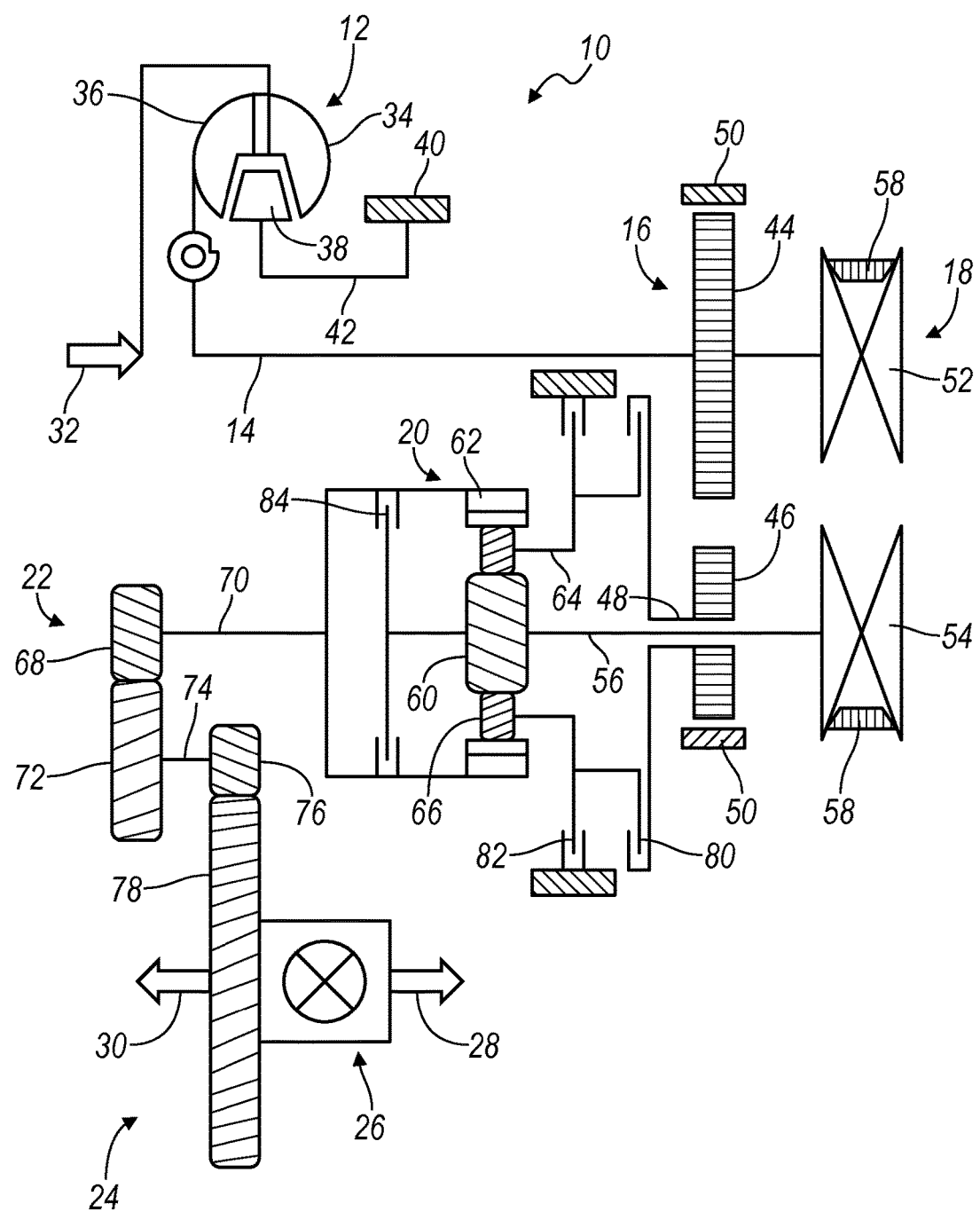

TORQUE SPLIT CONTINUALLY VARIABLE TRANSMISSION

BACKGROUND OF THE INVENTION

1. Field of the Invention

This invention relates generally to a continually variable transmission (CVT) that is able to produce forward and reverse drive and to operate in a torque split mode.

2. Description of the Prior Art

CVT transmissions produce variable speed ratio required for a motor vehicle by changing the radial position at which a drive belt engages an input pulley and an output pulley. But CVT transmissions may have low mechanical efficiency and a limited range of drive ratio.

A need exist for a control technique or kinematic arrangement that extends the overdrive range of a CVT transmission, provides the reverse drive function required for a torque converter vehicle launch using a CVT, yet requires a minimum number of friction control elements, such as clutches and brakes.

SUMMARY OF THE INVENTION

A transmission includes a first drive secured to an input, producing a fixed drive ratio; a second drive secured to an input, producing a variable drive ratio; a planetary gearset including a member connected to the second drive, and a second member; a brake releasably holding the second member rotatably fixed; a first clutch releasably connecting the first member and an output; and a second clutch releasably connecting the second member and the first drive.

The transmission is a two mode CVT having a variator mode and a split torque mode. When operating in the torque split overdrive range, ratio range is extended and overdrive efficiency is improved, due to a portion of the torque being delivered directly.

The mixing planetary gear set also provides the reversing function required in a CVT transmission that relies on a torque converter to participate in the vehicle launch condition.

A chain drive having a fixed drive ratio provides direct torque input to the mixing planetary gearset.

Torque amplification of a torque converter, located between the power source and the transmission's input shaft, aids in launching the vehicle from a stop.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which:

FIG. 1 is a schematic diagram of the kinematic arrangement of an automatic transmission for a motor vehicle.

DESCRIPTION OF THE PREFERRED EMBODIMENT

The transmission assembly 10 of FIG. 1 includes a torque converter 12; an input shaft 14, a fixed ratio chain drive 16; a variable ratio drive 18; a planetary gearset 20; a transfer gearset 22; a final drive 24; and an inter-wheel differential 26 for transmitting rotating power to right-hand and left-hand axle shafts 28, 30.

The crankshaft 32 of an internal combustion engine, or the shaft of another power source, is connected to the torque converter's impeller 34, which hydrokinetically drives its turbine 36. Fluid flow exiting the blades of turbine 36 in the torque converter is directed through a stator 38 onto the blades of the impeller 34. Stator is held fixed by a casing 40 through a stator shaft 42.

The input sprocket 44 of the fixed ratio chain drive 16 is secured to input shaft 14, and the output sprocket 46 is secured to a sleeve shaft 48. A drive chain 50 engages sprockets 44, 46.

An input pulley 52 of the variable ratio drive 18 is secured to input shaft 14, and the output pulley 54 is secured to an intermediate shaft 56, which passes through sleeve shaft 48. A drive belt 58 engages pulleys 52, 54, whose diameter of contact with belt 58 is variable.

The planetary gearset 20 includes a sun gear 60 secured to shaft 56, a ring gear 62, a carrier 64; and planet pinions 66 supported on the carrier and meshing with the sung gear and ring gear.

The transfer gearset 22 includes a pinion 68 secured to an output shaft 70 and a gear 72 meshing with the pinion 68 and secured to a shaft 74.

The final drive 24 includes a pinion 76 secured to a shaft 74 and a gear 78 meshing with the pinion 78 and secured to the ring gear of differential 26.

A torque split clutch 80 alternately opens and closes a drive connection between output sprocket 46 and carrier 64 when the assembly 10 is operating in a power split mode, i.e., when both the fixed ratio chain drive 16 transmits power to carrier 64 and the variable ratio belt drive 18 transmits power to sun gear 60.

A reverse brake 82 is engaged to produce reverse drive by holding carrier 64 fixed against rotation. In reverse drive, ring gear 62 and output shaft 70 are underdriven in a reverse direction compared to the speed and direction of sun gear 60, which is continually driveably connected to output pulley 54.

When the assembly 10 is operating in CVT mode, i.e., when torque split clutch 80 is open, thereby disconnecting chain drive 16 from the planetary gearset 20, clutch 84 is engaged, thereby producing a direct drive connecting between output pulley 54 through clutch 84 and output shaft 70 to the transfer gearset 22.

In one example, the chain drive 16 has a 0.5:1 drive ratio; the variable drive 18 drive ratio range is 2.3-0.43:1; the transfer gearset 22 has a 2:1 drive ratio; the final drive 24 has a 3.5:1 drive ratio; and beta, i.e., the ratio of the ring gear pitch diameter to the sun gear pitch diameter, is 2.0.

Reverse drive is produced with power transmitted from the engine shaft 32, through the torque converter 12, variable drive 18 and planetary gearset 20 with brake 82 engaged. Clutches 80 and 84 are disengaged in reverse drive.

The assembly 10 operates in a torque split mode with power transmitted from the engine shaft 32 through the torque converter 12, chain drive 16, variable drive 18 and planetary gearset 20 with clutch 80 engaged. Clutch 84 and brake 82 are disengaged in the torque split operating mode. In this instance planetary gearset 20 performs as a torque split device mixing torque transmitted from chain drive 16 through clutch 80 to carrier 64, and torque transmitted from variable drive 18 to sun gear 60. The split torque mode provides extended overdrive range. In the split torque mode, the drive ratio can be reduced to 2.17, provided the variable drive 18 operates at its 2.3:1 ratio and the drive ratios of the other components are as stated in the example.

The assembly 10 operates in a torque split mode with power transmitted from the engine shaft 32 through the torque converter 12, chain drive 16, variable drive 18 and planetary gearset 20 with clutch 80 engaged. Clutch 84 and brake 82 are disengaged in the torque split operating mode. In this instance planetary gearset 20 performs as a torque split device mixing torque transmitted from chain drive 16 through clutch 80 to carrier 64, and torque transmitted from variable drive 18 to sun gear 60, ring gear 62 being the output of gearset 20. The split torque mode provides extended overdrive range. In the split torque mode, the drive ratio can be 2.17 increased, provided the variable drive 18 operates at its 0.43:1 ratio and the drive ratios of the other components are as stated in the example.

In accordance with the provisions of the patent statutes, the preferred embodiment has been described. However, it should be noted that the alternate embodiments can be practiced otherwise than as specifically illustrated and described.

The invention claimed is:

1. A transmission, comprising:
a first drive driven by and directly connected to an input shaft, producing a fixed drive ratio;
a second drive driven by and directly connected to the input shaft, producing a variable drive ratio;
a planetary gearset including a first member driven by and directly connected to an output shaft of the second drive, and a second member;
a brake releasably holding the second member rotatably fixed;
a first clutch releasably connecting the first member to a planetary gear output shaft; and
a second clutch releasably connecting the second member to the first drive, wherein the input shaft and the output shaft of the second drive are connected to a same axial side of the second drive, and the output shaft of the second drive extends through the first drive.

2. The transmission of claim 1, further comprising:
a power source; and
a torque converter including an impeller driveably connected to the power source and a turbine driveably connected to the input shaft.

3. The transmission of claim 1, further comprising:
a transfer drive including a pinion secured to the planetary gear output shaft and a gear meshing with the pinion;
a final drive including a first pinion driveably connected to the gear, and a first gear meshing with the first pinion; and
a differential driveably connected to the first gear for transmitting rotating power from the first gear to first and second axle shafts.

4. The transmission of claim 1, wherein the first drive further comprises:
a first sprocket secured to the input shaft;
a second sprocket connected to the second clutch, with the output shaft of the second drive extending through the second sprocket; and
a first drive member engaged with the first sprocket and the second sprocket.

5. The transmission of claim 1, wherein the second drive further comprises:
a first pulley secured to the input shaft;
a second pulley connected to the first member via the output shaft of the second drive; and
a second drive member engaged with the first pulley and the second pulley, a location of engagement between the second drive member and the first pulley being variable, and a location of engagement between the second drive member and the second pulley being variable.

6. The transmission of claim 1, wherein:
the first member is a sun gear;
the second member is a carrier; and
the planetary gearset further comprises a ring gear secured to the planetary gear output shaft, and planet pinions supported on the carrier and meshing with the sun gear and the ring gear.

7. The transmission of claim 1, further comprising:
a sleeve shaft secured to the first drive, wherein the output shaft of the second drive passes through the sleeve shaft.

8. A transmission, comprising:
a planetary gearset including a first member rotationally fixed to a shaft that extends through a fixed ratio drive to variable drive driven by a power source, a second member releasably connectable through a first clutch to the fixed ratio drive, and a third member secured to an output;
a brake releasably holding the second member rotatably fixed; and
a second clutch releasably connecting the first member and the output.

9. The transmission of claim 8, wherein:
the first member is a sun gear;
the second member is a carrier;
the third member is a ring gear; and
the planetary gearset further comprises planet pinions supported on the carrier and meshing with the sun gear and the ring gear.

10. The transmission of claim 8, further comprising:
a torque converter including an impeller driveably connected to the power source and a turbine driveably connected to an input.

11. The transmission of claim 8, further comprising:
a transfer drive including a pinion secured to the output and a gear meshing with the pinion;
a final drive including a first pinion driveably connected to the gear, and a first gear meshing with the first pinion; and
a differential driveably connected to the first gear for transmitting rotating power from the first gear to first and second axle shafts.

12. The transmission of claim 8, wherein the fixed ratio drive further comprises:
a first sprocket secured to an input;
a second sprocket connected to the first clutch, with the shaft extending through the second sprocket; and
a first drive member engaged with the first sprocket and the second sprocket.

13. The transmission of claim 12 wherein the second sprocket is coaxial with the shaft.

14. The transmission of claim 8, wherein the variable drive further comprises:
a first pulley secured to an input;
a second pulley connected to the first member via the shaft; and
a second drive member engaged with the first pulley and the second pulley, a location of engagement between the second drive member and the first pulley being variable, and a location of engagement between the second drive member and the second pulley being variable.

15. The transmission of claim 8, further comprising:
a sleeve shaft secured to the fixed ratio drive, wherein the shaft passes through the sleeve shaft.

16. The transmission of claim 8, wherein the first member and the power source are connected to a same axial side of the variable drive.

* * * * *